US008261429B2

(12) United States Patent
Halstead

(10) Patent No.: US 8,261,429 B2
(45) Date of Patent: Sep. 11, 2012

(54) ARCUATE COIL WINDING AND ASSEMBLY FOR AXIAL GAP ELECTRO-DYNAMO MACHINES (EDM)

(76) Inventor: Richard Halstead, Rohnert Park, CA (US)

( * ) Notice: Subject to any disclaimer, the term of this patent is extended or adjusted under 35 U.S.C. 154(b) by 10 days.

(21) Appl. No.: 12/651,034

(22) Filed: Dec. 31, 2009

(65) Prior Publication Data

US 2010/0101074 A1 Apr. 29, 2010

Related U.S. Application Data

(62) Division of application No. 11/743,552, filed on May 2, 2007, now Pat. No. 7,646,132.

(51) Int. Cl.
*H02K 15/04* (2006.01)

(52) U.S. Cl. ......................................... 29/596; 310/268

(58) Field of Classification Search ............ 29/596–598, 29/605, 609, 732–736; 310/268, 156.32
See application file for complete search history.

(56) References Cited

U.S. PATENT DOCUMENTS

| | | | | |
|---|---|---|---|---|
| 5,334,898 | A * | 8/1994 | Skybyk | 310/268 |
| 6,046,518 | A * | 4/2000 | Williams | 310/43 |
| 6,828,710 | B1 * | 12/2004 | Gabrys | 310/179 |
| 2004/0080869 | A1 * | 4/2004 | Thompson Rea et al. | 360/126 |

FOREIGN PATENT DOCUMENTS

JP 5583449 * 6/1980

* cited by examiner

*Primary Examiner* — Minh Trinh
(74) *Attorney, Agent, or Firm* — Edward S. Sherman

(57) ABSTRACT

An axial gap EDM deploys as a stator coils a series of two parallel serpentine windings that each circumscribe an arc segment of a circle. Each arc segment that forms the stator winding assembly is powered as a separate phase. The two winding are readily formed by shaping one or more wire segment. Preferably the parallel winding are arranged to overlap with a half period rotational offset such that the radial directed serpentine segments of that are disposed above and below the stator disk are interlaced when viewed in projection through the disk. In one embodiment, each series of serpentine winding are separated by a gap so that they can be inserted on the stator disk from the edge. A separate rotor disk is adjacent each side of this stator disk. In another embodiment, each series of serpentine winding are separated by a gap, so they can be inserted to surround a single rotor disk which has two series of magnets disposed on opposite sides.

14 Claims, 8 Drawing Sheets

130
150
140

X 10
150
120
100
205
r
211
215
215
210
101
215'
215'
212
110
r
15
20
105 t
5

1030
1001
1010
1020

1150
1171
1161
1161'
1162
1162'

1150
1151
1161
1162

1150
1010
1030

1150

205a
215
225
215'
225'
225"
205b
205
205'
205"
N
S

ARCUATE COIL WINDING AND ASSEMBLY FOR AXIAL GAP ELECTRO-DYNAMO MACHINES (EDM)

CROSS REFERENCE TO RELATED APPLICATIONS

The present application claims priority to and is a division of the US patent application of the same title having application Ser. No. 11/743,552 that was filed on May 2, 2007, and is expected to issue as U.S. Pat. No. 7,646,132 on Jan. 12, 2010.

BACKGROUND OF INVENTION

The present invention relates to axial gap electro-dynamo machines.

Axial gap dynamo electric machines deploy stators and rotators that are generally in the shape of parallel and adjacent planar discs, with one of more rotators attached to an axle that passes through the center of each disk.

The stator comprises multiple windings that generally wrap across the radial direction of the disc. A Lorenz force is generated by the interaction with magnets arranged along the periphery of the rotor disc. A more detailed description of this technology can be found in the U.S. Pat. Nos. 4,567,391; 4,578,610; 5,982,069; and 5,744,896, all of which are incorporated herein by reference.

The inventors have recognized that axial gap EDM's are ideally suitable for Vertical Axis Wind Turbine (VAWT) designs. VAWT offers a number of advantages over conventional Horizontal Axis Wind Turbine (HAWT), such as lower maintenance costs and increased durability and reliability. VAWT installations are believed to present a significantly lower hazard to migrating birds as HAVT systems.

While VAWT systems are also more economically viable in remote locations than 100+ kW HAWT systems, there is an ongoing need to improve the efficiency of such machines as well as lower their capital cost so reduce the cost of electrical power derived from this renewable energy resource, and make small to medium size facilities more economically viable for say small communities or even the individual homeowner.

Accordingly, it is a general object of the invention to improve the quality and economic viability of large scale axial gap electro-dynamo machines (EDM) for use as generators and motors.

It is a more specific object of the invention to provide a more efficient method winding the stator coils of such generators and motors.

It is an additional objective of the invention to provide a more efficient method of stator assembly for large scale axial gaps EDM's.

It is a further objective of the invention to provide improved methods of thermal management of heat generated with the stator structure.

It is a further objective of the invention to provide the above benefits at least in part through an improved efficiency through the concentration of the magnetic field with respect to it's interaction with the stator structure.

SUMMARY OF INVENTION

In the present invention, the first object is achieved by providing an axial gap dynamo machine wherein the stator coil has an upper at least arc shaped serpentine wire segment, a lower at least arc shaped serpentine wire segment. Each serpentine path is made up of a series of connected wire segments in the order of a radial segment, an inner tangential segment, a second radial segment, an outer tangential segment. The upper and lower segments are joined at the periphery and spaced apart to provide a gap for a rotor plate having at least one sequence of magnets disposed in a common plane.

A second aspect of the invention is characterized in that a plurality of arc shaped segment are inserted around the sides of the rotor disk to form a complete winding covering the rotor disk, with each segment connected as separate phase for power or rotary motion generation.

Yet another aspect of the invention is the method of forming the arc shaped serpentine coil assemblies by first forming an insulated wire into a continuous coil and then wrapping the coil around at least one preform to form bends that define at least a portion of the serpentine path in at least one common plane.

A still further aspect of the invention is the method of forming the stator structure or assembling a stator structure to surround the rotor disk by first encapsulating the arc shaped serpentine coil segments in a dielectric thermally conductive medium, such as fiber reinforced concrete. The arc shaped segments having a sideways U-shaped cross section are then inserted around the rotor disk.

The above and other objects, effects, features, and advantages of the present invention will become more apparent from the following description of the embodiments thereof taken in conjunction with the accompanying drawings.

DETAILED DESCRIPTION

Figure 1:
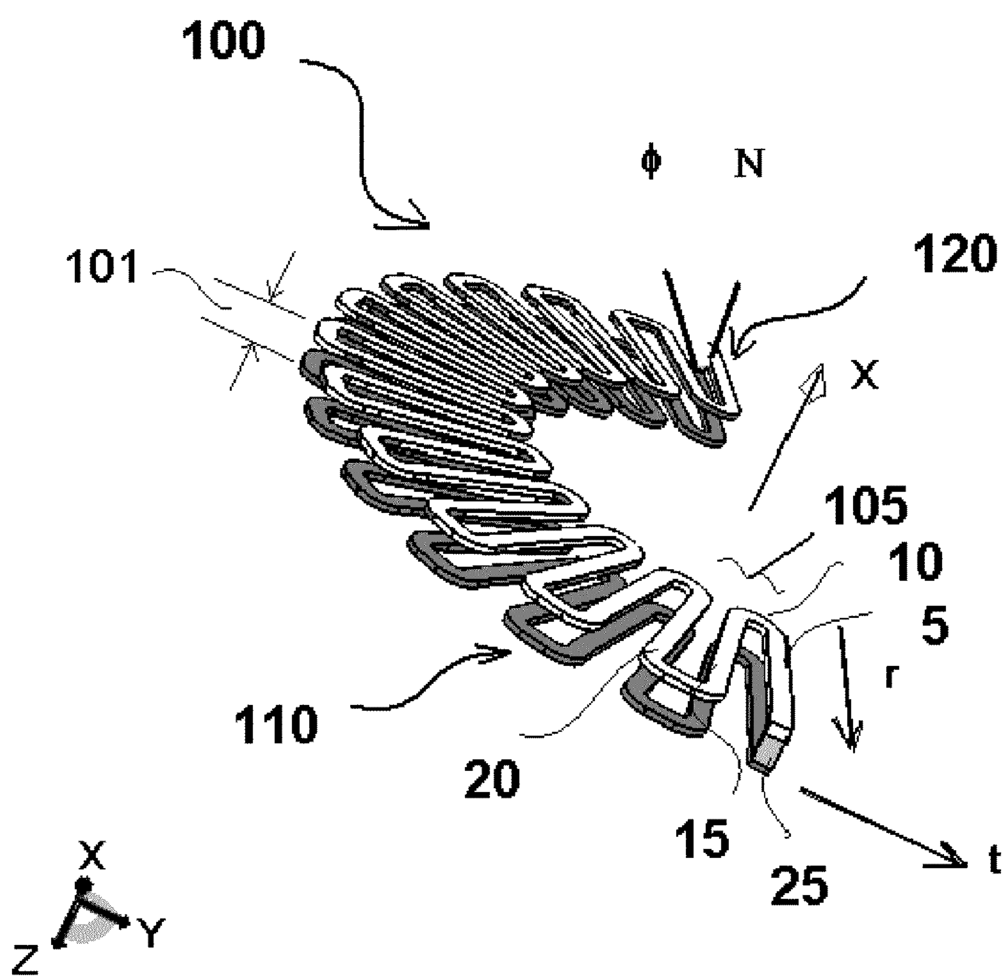
FIG. 1 is a perspective view of a stator winding according to a first embodiment of the invention.

Referring to FIGS. 1 through 10, wherein like reference numerals refer to like components in the various views, there is illustrated therein a new and improved axial gap EDM with an arcuate coil winding, generally denominated 100 herein.

In accordance with the present invention, FIG. 1 illustrates in perspective view a stator coil 100 with arcuate coil winding. The stator coil 100 subtends an arc of a circle to be assembled with additional stator coils as a disk shaped stator structure 250 as will be described in the FIG.'s that follow with respect to alternative embodiments.

Figures 2A, 2B, 2C:
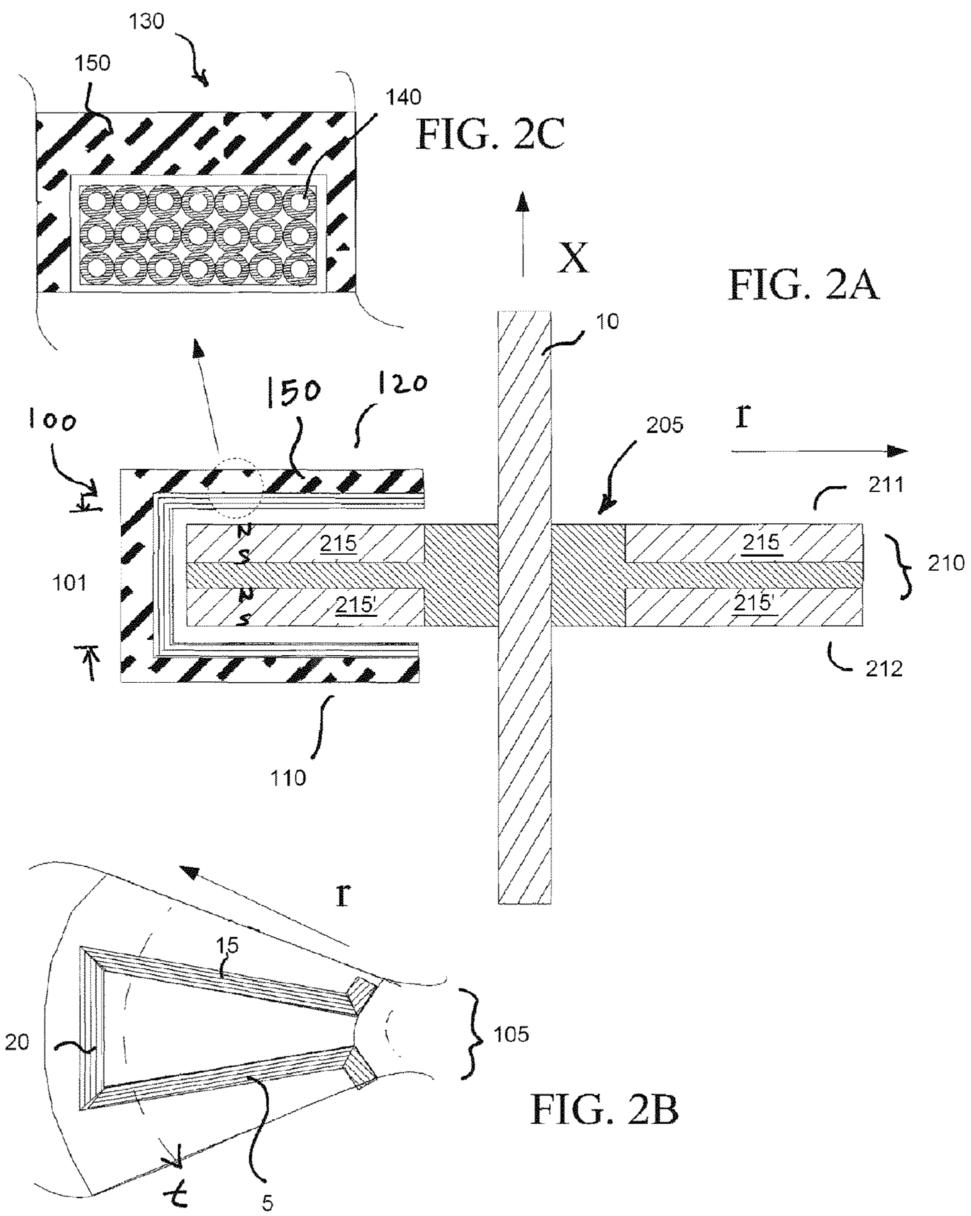
FIG. 2A is a cross-sectional elevation of the stator coil of FIG. 1 showing the related rotor and attached axle structure.
FIG. 2B is a partial plan view of a portion of the stator winding.
FIG. 2C is an enlarged partial section through a wire that comprises the winding of FIG. 1.

Stator coil 100 comprises an upper arc shaped serpentine wire segment 120 and a lower arc shaped serpentine wire segment 110, which are connected by at least one wire segment 25 that traverses the separate but parallel planes within which each of segments 110 and 120 are disposed. In each of the wire segments 110 and 120, each serpentine path is made up of repeating series 105 of connected wire sub-segments in the order of a radial segment 5, an inner tangential segment 10, a second radial segment 15 and an outer tangential segment 20. The electrical connections in this embodiment are made at terminals marked as phase (ϕ) and neutral (N) as the outer periphery of the arcuate coil segment 100. A portion or segment of stator coil upper segment 120 is shown in Plan view is illustrated in FIG. 2B, with separate reference arrow in each Figure indicating the radial (r) and tangential (t) coordinate axes. The X-axis corresponds to the principle axis of axle 10.

As the upper 120 and lower 110 segments are joined at the periphery by wire segment 25, they are also spaced apart to provide a gap having the thickness represented by reference numeral 101 for inserting around either a rigid stator plate or a rotor plate having magnets.

FIG. 2A illustrates an alternative embodiment of the invention of an axial gap EDM 200 with a plurality of stator coil 100 (shown only on the left side of the figure) surrounding a single rotor disk 205. This rotor disk 205 in this embodiment has magnets 215 arrayed the upper side and magnets 215' arrayed on the opposite or lower sides. It should be understood that it is the intention in the preferred embodiments that each stator disk 250 when assembled into the working EDM comprise a plurality of stator coils 110 assembled to surround at least one rotor disk 205, as shown in cross-sectional elevation in FIG. 2B. It is more preferable to first form a plurality of wedge of half circle stator disc 2100 by potting the dual layer stator coil 100, and then slipped or inserted it edgewise with respect the dual layer rotor disk 205. The rotor disk 205 is in a rotary co-axle connection to the axle 10 and having at the periphery of the upper 211 and lower 212 surface an array 210 of permanent magnets, portion of which are illustrated in a transverse of tangential cross-section in FIGS. 3 and 5.

FIG. 2B is a section view through a winding 130 in cross-section containing a plurality of insulated wire bundles 140. It should be appreciated that wire 140 can be round, but is alternatively of a flat cross-section to form a ribbon like shape. Preferably each segment of the wire contains multiple insulated strands, each plural wound in the serpentine shape. FIG. 2C is a plan view of segment 105. FIG. 2C represents a preferred embodiment wherein a thermally conductive dielectric potting or encapsulating media 150 surrounds at least the portion 5 and 15 of the stator coil shown in FIG. 2B. Such a preferred form of an encapsulating media is fiber reinforced cement. In essence, it is more preferred that the cement that encapsulates the stator windings, when solidified form the stator disk itself. Alternatively, another disk provided onto which the stator coil is then attached, and then covered by cement.

Figure 3A:
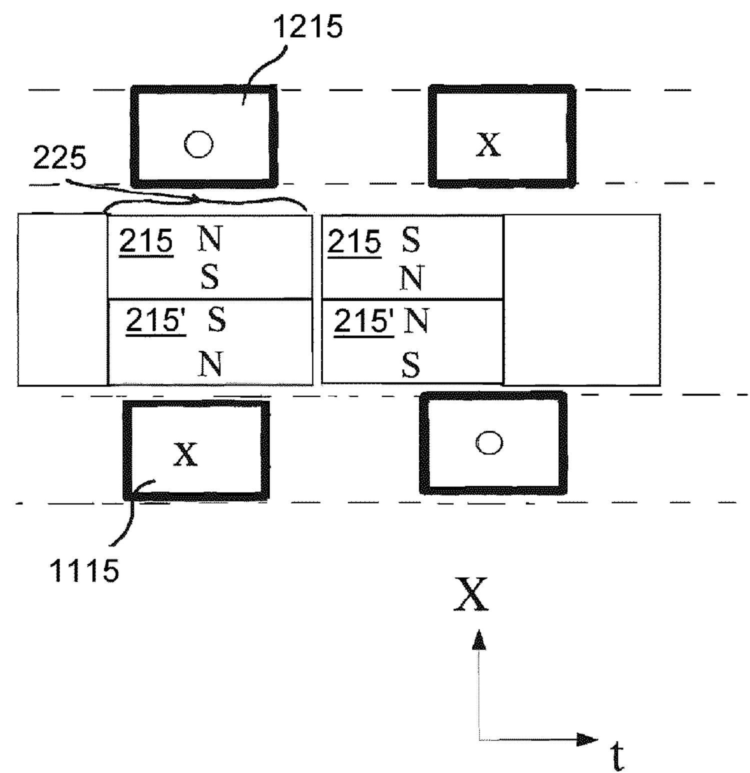
FIGS. 3A and 3B are alternative embodiments for the arrangements of magnets on the rotor disk with an EDM having the stator coil shown in FIG. 1
Figure 3B:
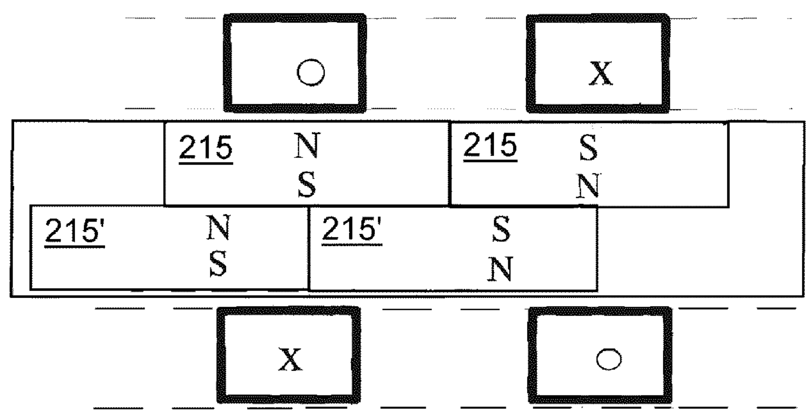

Alternative embodiments for arranging and orienting the permanent magnets of array 210 are shown in FIGS. 3A and 3B. Each of these figures is an elevation facing the edge of the rotor structure with only the radial segments of the stator winding shown. The direction of current flow in each winding segment is represented by an "o" for current flowing backwards from the plane of the Figure (the X-t plane) an "x" representing current flowing forward from the plane of the Figure, that is toward the viewer.

It first should be noted that the rotor requires that magnets are disposed in 2 overlapping layers. In FIG. 3A the magnets in the upper layer are stacked over the magnets in the lower layer. The magnets in the upper layer are denoted as 125 and the magnets in the lower layer are denoted 125'. In contrast in FIG. 3B, the magnets in the upper layer are offset or staggered to lie in between in pair of adjacent magnets in the upper layer.

In a first pair of overlapping pair of 225, magnets the upper magnet is oriented with the North Pole, "N", facing up. However, the lower magnet 125' is inverted so that the North Pole now faces down. This orientation is necessary, as for example in the case of a motor, so that the current going into the plane in the upper coil segment 1215 exerts a force on the rotor disk, in interacting with magnet 215, which is in the same direction as the opposite flowing current out of the plane in the lower coil segment 1125. It should be noted that the current in the lower coil segment 1125 interacts with magnet 215'.

However, in the configuration shown in FIG. 3B, the upper and lower magnets can be oriented with there north poles facing the same direction, as the staggering of the upper magnets 215 with respect to the lower magnets 215' avoid the simultaneous application of opposing forces on the rotor.

Figure 4:
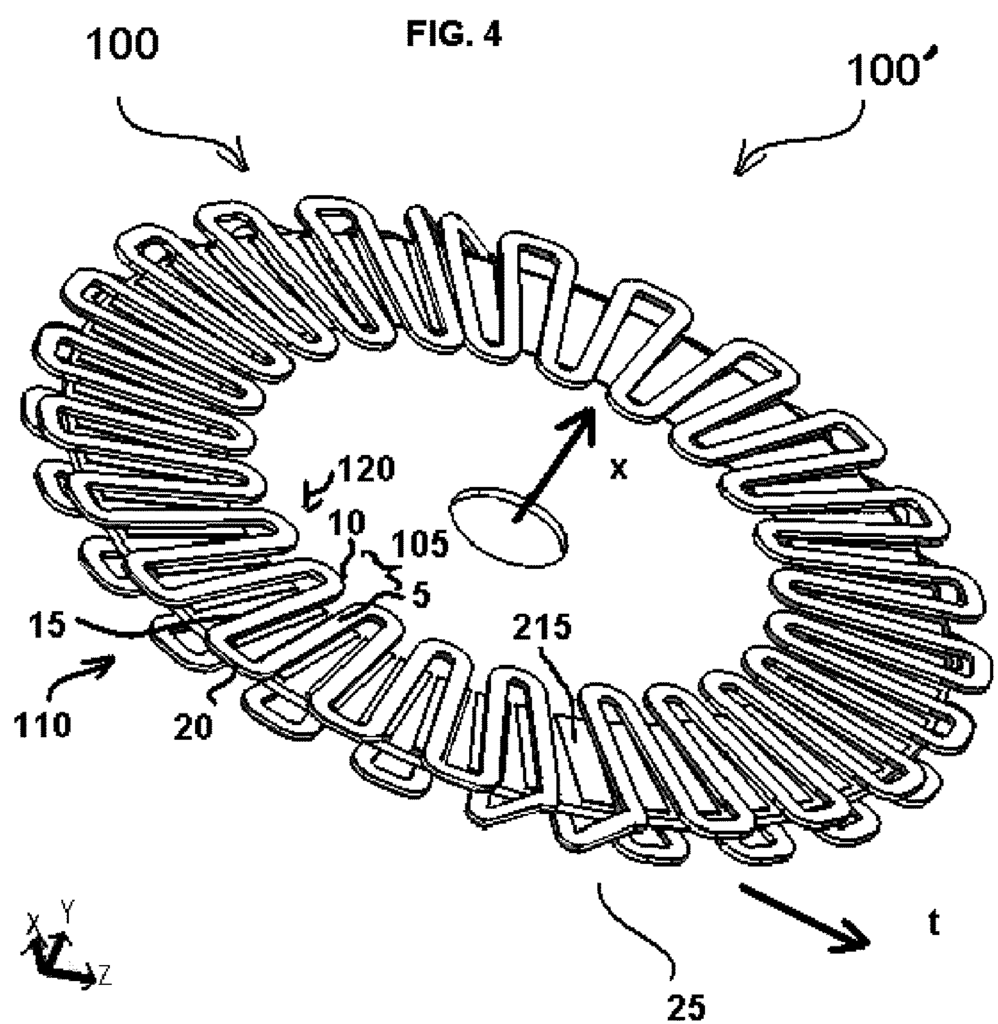
FIG. 4 is a perspective view of a stator winding according to another embodiment of the invention.

In accordance with another embodiment of the present invention, FIG. 4 illustrates in perspective view a stator coil with two arcuate coil winding 100. Each arcuate or wedge shaped stator winding 100 and 100' subtends a half circle and are mounted to straddle the disk shaped rotor structure 205 as will be described in the FIG.'s that follow.

Each of the stator coil 100 and 100' in FIG. 4 comprises an upper arc shaped serpentine wire segment 120 and a lower arc shaped serpentine wire segment 110, which are connected by at least one wire segment 25 that traverses the plane separating the upper and lower half is curved to follow diagonal path across the curved X-t surface such that the upper and lower arc segments are offset laterally by a half repeat unit 105. This offset is more apparent in FIG. 5A, which is a cross sectional elevation of the X-r plane the relationship between the stator structure and the rotor magnets 215.

Figure 5A:
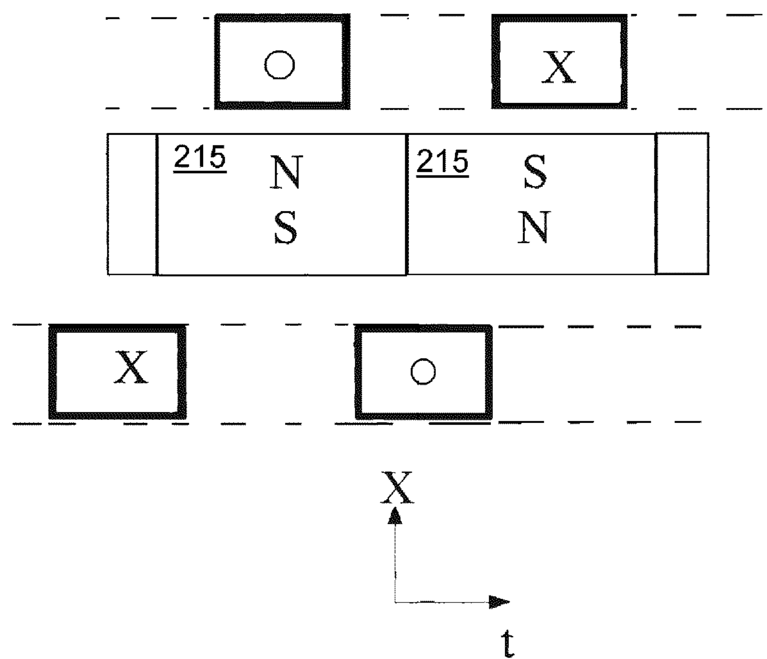
FIGS. 5A and 5B are alternative embodiments for the arrangements of magnets on the rotor disk with an EDM having the stator coil shown in FIG. 4.
Figure 5B:
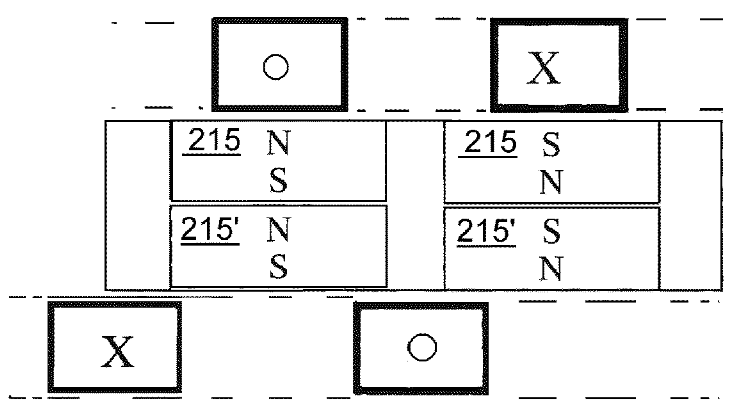

Thus, FIGS. 5A and 5B are elevations facing the edge of the rotor structure with only the radial segments of the stator winding shown. Again, the direction of current flow in each winding segment is represented by an "o" for current flowing backwards from the plane of the Figure (the X-t plane) an "x" representing current flowing forward from the plane of the Figure, that is toward the viewer. It should be noted that because of the transverse segment 25 the upper coil 120 and the lower coil 110, the radial segments of each winding are laterally staggered in the tangential direction. This staggering provides for at least two alternative orientations of magnets 215.

In FIG. 5A a plurality of magnets 215 are arrayed adjacent to each other in a single layer. Each magnetic 215 is oriented with opposite polarity of the adjacent magnet 215. In FIG. 5B the magnets are disposed in 2 overlapping layers with the magnets in the upper layer 215 are stacked over the magnets in the lower layer 215'. Because of the lateral staggering of the coil segments of opposing sides of the stator, the magnets 215 in the upper layer need not be oriented in the opposite orientation of the magnetic 215' immediately below in the lower layer. This is in contrast to the configuration shown in FIG. 3A and provides the benefit of a more concentrated magnetic field to increase power of the motor or the efficiency of the EDM when operated as a generator.

Figure 6:
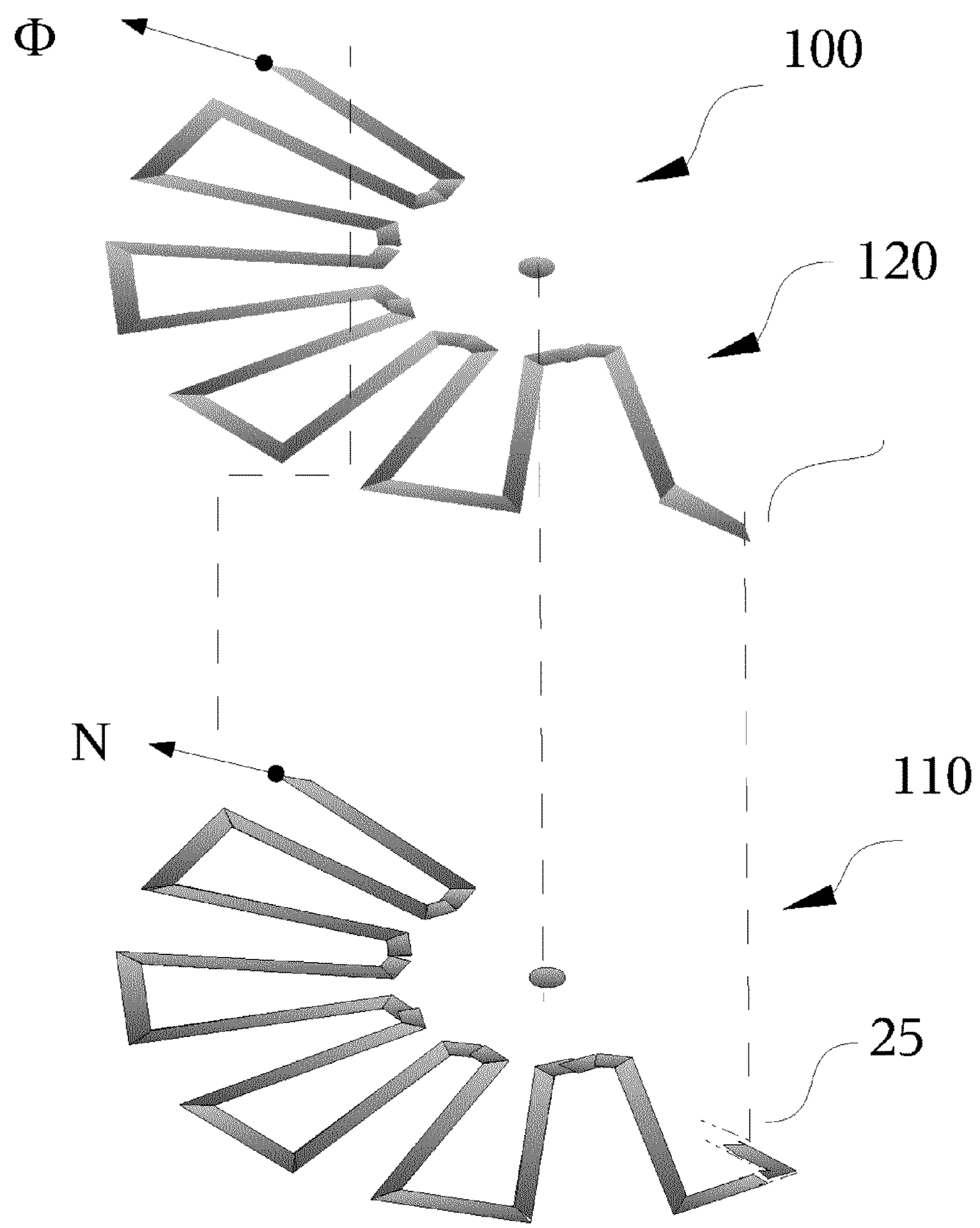
FIG. 6 is an exploded view illustrating a preferred arrangement for locating the terminals of a stator winding of the type shown in FIG. 1 or FIG. 4

FIG. 6 is an exploded perspective view of the rotor structure in FIG. 4 showing in more detail that a connecting wire segment 25 traverses between upper arc shaped serpentine wire segment 120 and a lower arc shaped serpentine wire segment 110 disposed in parallel planes spaced apart by gap 101. The electrical connections in this embodiment are made at terminals marked as phase (ϕ) and neutral (N) as the outer periphery of the arcuate coil segment 100.

Figure 7B:
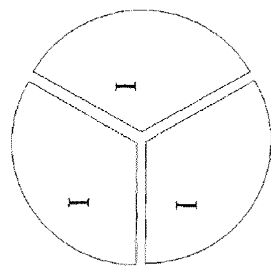
FIG. 7A is a cross-sectional elevation of a plurality of stator coils and related rotor structures according to another embodiment of the invention.
FIGS. 7 B, C and D illustrate the three-phase wiring of the stator coils in FIG. 7A.
Figure 7C:
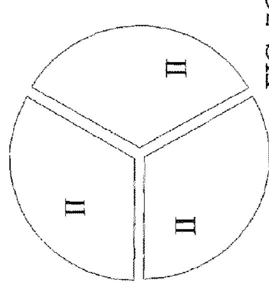
Figure 7D:
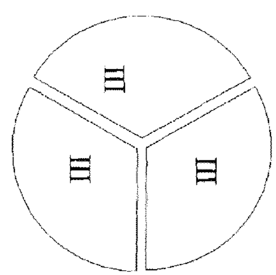
Figure 7A:
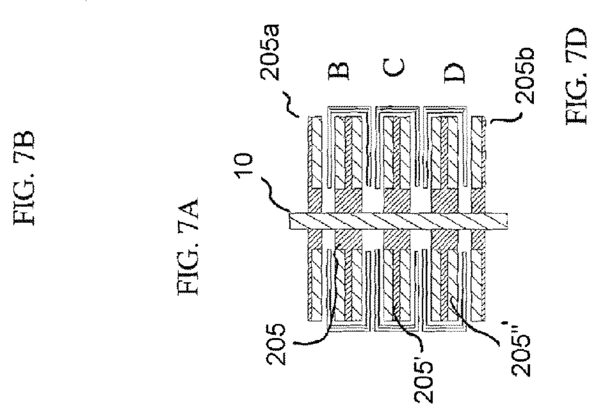

FIG. 7A is a cross-sectional elevation of a plurality of stator coils and related rotor structures in an EDM according to another embodiment of the invention. Stacked stators labeled B, C and D surround a rotor having a plurality of rotor disks 205 connected by common axial 10. Each of the FIGS. 7 B, C and D illustrate the three-phase wiring of the stator coils in FIG. 7A, with the plurality of three type B stators in FIG. 7B all being wired to the first phase of the power circuit. Likewise, In FIG. 7C, the plurality of three type C stators in are all wired to the second phase of the power circuit. Further, as shown in FIG. 7C, the plurality of three type D stators in are all wired to the third phase of the power circuit. This configuration simplifies the wiring connections at the terminals of each stator segment, and avoids the possibility of short circuit if the insulating layer of the wiring in any segment is damaged. In such case, it may be preferable to wire each of the three upper stator segments together in series, but for a terminal that connects across the upper and lower stator segments, with the lower three stator segments also being connected in series. In this case each of the assembled stator sets that surround a rotor in the completed EDM has a signal adjacent phase and neutral terminal connection.

Figure 8:
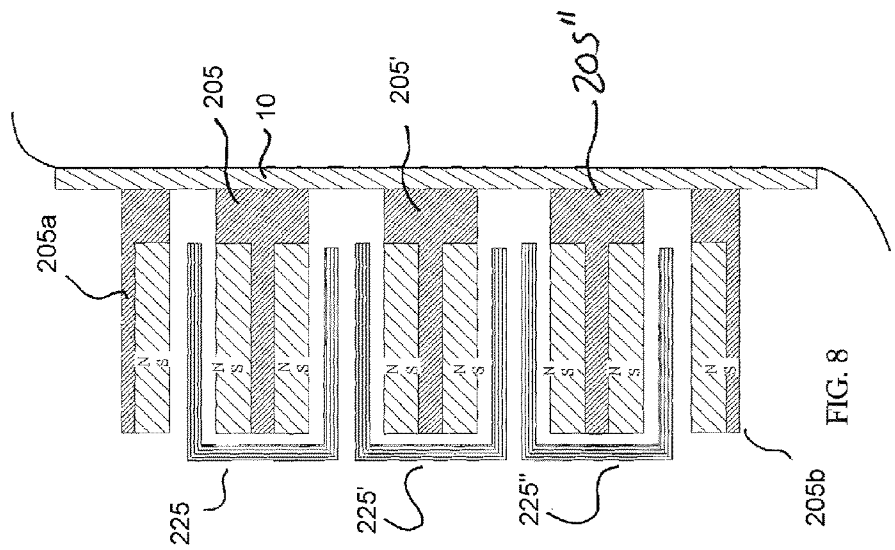
FIG. 8 is a schematic elevation comparing the available orientation of the magnets on the rotors for the embodiments of the three phase wiring with the stator windings shown in FIG. 4.

FIG. 8 is a schematic elevation showing one embodiment of the orientation of the magnets on the rotors 205 for the embodiments of the three phase wiring with the stator structure 250 shown in FIG. 4. Each of the rotors 205, 205' and 205" surrounded by a stator has an upper and lower set of magnets in the, each magnet is oriented with N pole facing up. On the terminal rotors **205*a* and 205*b*** that only have a single magnet layer, each magnet is oriented with N pole facing up.

Figures 9, 10A, 10B, 10C, 10D, 10E:
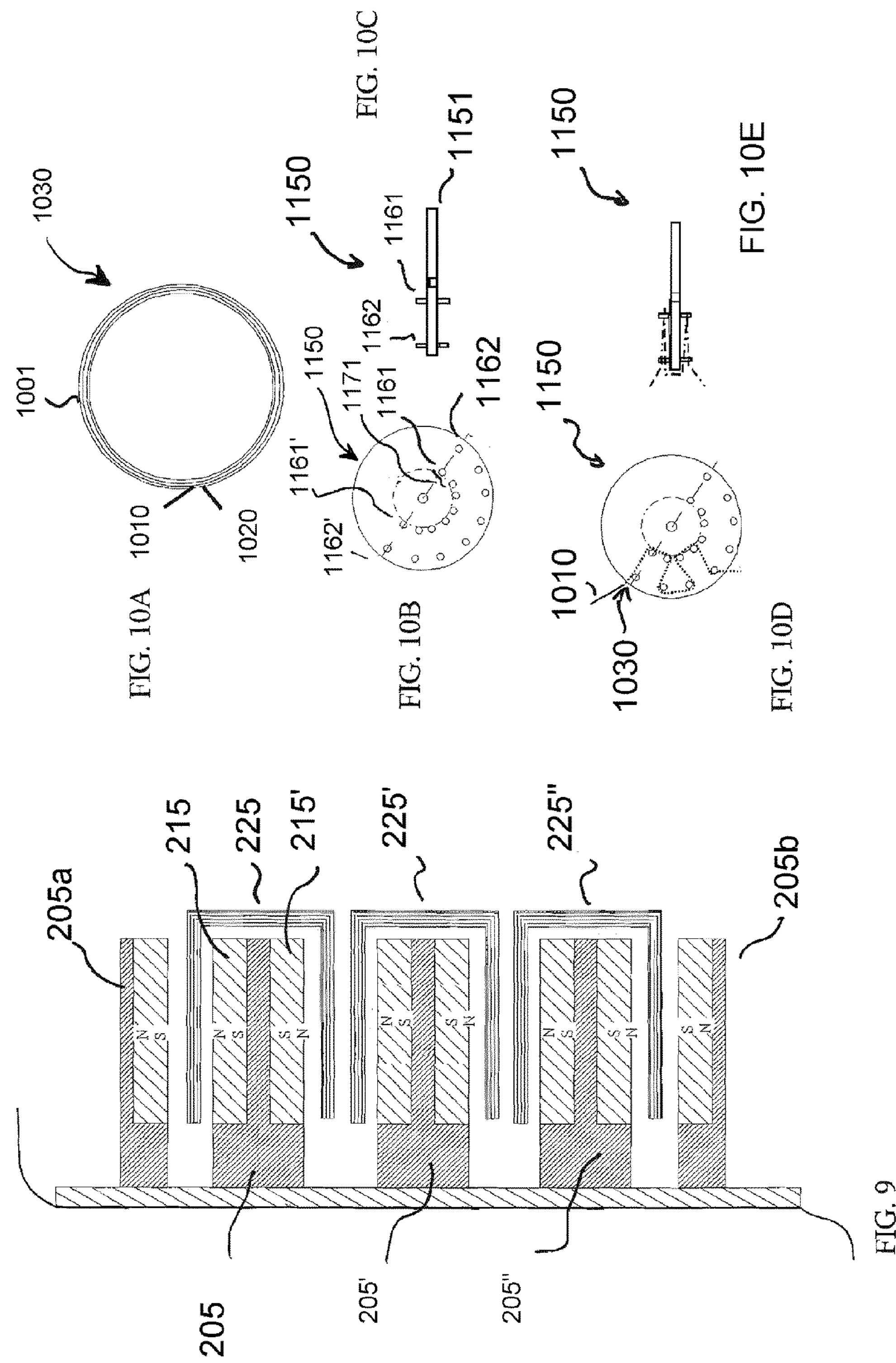
FIG. 9 is a schematic elevation comparing the available orientation of the magnets on the rotors for the embodiments of the three phase wiring with the stator windings shown in FIG. 1.
FIGS. 10A, B, C, D and E illustrates an embodiment of a preferred method of winding the stator coils.

FIG. 9 is a schematic elevation of another embodiment showing an alternative orientation of the magnets on the rotors for the embodiments of the three phases of wiring with the stator windings shown in FIG. 1. Each of the rotors 205, 205' and 205" is surrounded by the stator 225 and has an upper 215 and lower 215' set of magnets. Each upper set of magnet 215 is oriented with N pole facing up, while each lower set of magnets 215' is oriented with the North Pole facing down.

FIGS. 10A, B, C, D and E illustrate an embodiment of a preferred method of winding the stator coils into arc shaped segment using a preform as a guide or track for the wire and the bends or folds therein. First, as shown in FIG. 10A insulated wire 1001 is wound around a circular form to form a coil of predetermined diameter with a multiple coil segment so that it terminates preferably in adjacent end terminals 1010 and 1020, forming loop 1030.

FIGS. 10B and 10C are plan and elevation views respectively of one embodiment of preform type winding frame 1150 used to shape loop 1030 into the configurations shown in FIG. 1 and FIG. 4. Winding frame 1150 is substantially circular plate 1151 having an inner series of pegs 1161 extending from at least one, and preferably both sides. At the periphery of circular plate 1151 is a second series of outer pegs 1162, which as shown in FIG. 10C, also extend to both sides of plate 1151. It should be appreciated that the pegs are spatially arranged in a predetermined manner to be disposed at the bending or deflection points of the stator winding in configuration shown in FIGS. 1 and 4. Thus, the inner pegs 1161 are arranged closer to each other than the outer pegs 1162 to define the wedge shape of each winding segment.

As shown in FIGS. 10D and E, in the next step, the insulated wire loop 1030 is next wound into a serpentine coil using a preform, such as the frame and pegs shown in FIGS. 10B and 10C. Thus, it is intended that the pegs be used to bend and then route the wire coil 1030 into a serpentine coil shape by repeated wrapping around at least an arc of plate 1151, first between outer peg 1162 and the nearest inner peg 1161, then to the next adjacent inner peg, followed by tight wrapping to the next outer peg and so on in the same direction under the desired wedge angle is subtended. At this point, winding frame 1150 can be flipped so that winding proceed to the other side. Wrapping to the reverse side of frame 1150 is shown in FIG. 10E. Alternatively, a segment can be folded over to form sideways facing U shape after wrapping on one side of frame 1150.

It should be appreciated that the above method is not limited to the form of the preform shown, but may use bend, wrap or compress the serpentine coil.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A method of forming an axial gap dynamo electric machine, the method comprising the steps of:

a) providing;
  i) an axle,
  ii) at least one rotor disk having at the periphery at least one circular array of permanent magnets with each magnet of said disk having an alternating orientation of the poles with respect to the adjacent magnets,
  iii) a plurality of arc shaped stator coil segments in which the stator windings form serpentine path in two parallel planes that are spaced apart by a gap and connected at the outer periphery of the arc so that each arc shaped segment has U-shaped radial cross-section, the gap between the two parallel planes being at least greater than the thickness of the at least one rotor disk,
b) attaching the at least one rotor disk in rotary co-axle connection to said axle,
c) inserting the two of more stator coils as adjacent segments around the periphery of the at least one rotor disk so that both of the connected serpentine winding straddle the rotor disk from opposite sides thereof, wherein the serpentine stator winding of the arc shaped stator coil segments in each of the two planes are spaced apart by a gap and are encapsulated in a dielectric thermally conductive medium.

2. The method of forming an axial gap dynamo electric machine according to claim 1 wherein the dielectric thermally conductive medium is fiber reinforced concrete.

3. The method of forming an axial gap dynamo electric machine according to claim 2 wherein the serpentine stator winding of the arc shaped stator coil segments in each of the two planes spaced apart by a gap are encapsulated in a dielectric thermally conductive medium prior to said step of inserting.

4. A method of forming an axial gap dynamo electric machine, the method comprising the steps of:

a) providing;
  i) an axle, ii) at least one rotor disk having at the periphery at least one circular array of permanent magnets with each magnet of said disk having an alternating orientation of the poles with respect to the adjacent magnets, iii) a plurality of arc shaped stator coil segments in which the stator windings form serpentine path in two parallel planes that are spaced apart by a gap and connected at the outer periphery of the arc so that each arc shaped segment has U-shaped radial cross-section, the gap between the two parallel planes being at least greater than the thickness of the at least one rotor disk, b) attaching the at least one rotor disk in rotary co-axle connection to said axle, c) inserting the two of more stator coils as adjacent segments around the periphery of the at least one rotor disk so that both of the connected serpentine winding straddle the rotor disk from opposite sides thereof, wherein the serpentine stator winding of the arc shaped stator coil segments in each of the two planes are first formed by a process comprising the steps of:

A) providing at least one wire,

B) forming a first portion of the wire into a serpentine coil having a first segment, C) forming the adjacent portion of the wire into the second segment of the serpentine coil, D) doubly folding adjacent portions of the wire traversing the first and second segment such that the each of the first and second segment are disposed in two parallel planes that are offset by a gap corresponding to the separation of the double folds thereof.

5. The process for forming a stator coil for an axial gap EDM, according to claim 4 wherein the radial segments of the first serpentine coil are disposed substantially midway between radial segments of the second serpentine coil.

6. A method of forming an axial gap dynamo electric machine, the method comprising the steps of:

a) providing;

i) an axle, ii) at least one rotor disk having at the periphery at least one circular array of permanent magnets with each magnet of said disk having an alternating orientation of the poles with respect to the adjacent magnets, iii) a plurality of arc shaped stator coil segments in which the stator windings form serpentine path in two parallel planes that are spaced apart by a gap and connected at the outer periphery of the arc so that each arc shaped segment has U-shaped radial cross-section, the gap between the two parallel planes being at least greater than the thickness of the at least one rotor disk, b) attaching the at least one rotor disk in rotary co-axle connection to said axle, c) inserting the two of more stator coils as adjacent segments around the periphery of the at least one rotor disk so that both of the connected serpentine winding straddle the rotor disk from opposite sides thereof, and wherein the serpentine stator winding of the arc shaped stator coil segments in each of the two planes are first formed by a process comprising the steps of:

A) providing at least one wire,
providing at least one wire,

B) forming the at least one wire into a continuous coil,

C) wrapping at least a first portion of the wire coil formed in the previous step around a preform that outlines at least a portion of a first serpentine path of the stator coil that lies in a first common plane of the two parallel planes.

7. The method of forming an axial gap dynamo electric machine according to claim 6 wherein the process of forming the serpentine stator winding of the arc shaped stator coil segments further comprises the steps of:

A) wrapping at least a second portion of the wire coil not wrapped in the previous step around a preform that outlines a second serpentine path of the stator coil that lies in a second common plane of the two parallel planes.

8. The method of forming an axial gap dynamo electric machine according to claim 7 wherein the process of forming the serpentine stator winding of the arc shaped stator coil segments further comprises the step of:

A) twice bending adjacent portions of the wire coil between the first and second serpentine paths so as to dispose the second serpentine coil in the second common plane that is spaced away from the first serpentine coil that is disposed in the first common plane.

9. The method of forming an axial gap dynamo electric machine according to claim 7 wherein the first and second serpentine coil segment are an arc of a circle.

10. The method of forming an axial gap dynamo electric machine according to claim 6 wherein the radial segments of the first serpentine coil are disposed substantially midway between radial segments of the second serpentine coil.

11. A method of forming an axial gap dynamo electric machine, the method comprising the steps of:

a) providing;

i) an axle, ii) at least one rotor disk having at the periphery at least one circular array of permanent magnets with each magnet of said disk having an alternating orientation of the poles with respect to the adjacent magnets, iii) a plurality of arc shaped stator coil segments in which the stator windings form serpentine path in two parallel planes that are spaced apart by a gap and connected at the outer periphery of the arc so that each arc shaped segment has U-shaped radial cross-section, the gap between the two parallel planes being at least greater than the thickness of the at least one rotor disk, b) attaching the at least one rotor disk in rotary co-axle connection to said axle, c) inserting the two of more stator coils as adjacent segments around the periphery of the at least one rotor disk so that both of the connected serpentine winding straddle the rotor disk from opposite sides thereof, and further comprising the step of providing a stator coil for an axial gap dynamo electric machine that comprises:

A) at least one wire formed into a first series of serpentine coils disposed within a first common plane that defines an upper coil segment, B) at least one wire formed into a second series of serpentine coils disposed in second common plane that defines a lower coil segment, wherein the first and second common planes are parallel, C) each of said first and second series of serpentine coils circumscribing an arced segment of a circle by a series of joined contiguous wire segments that start at the outer periphery of the arced segment with, i) a first radial segment having an outer end and inner end;

ii) an inner tangential segment connected at a first end to the inner end of the first radial segment;

iii) a second radial segment, having an outer end and inner end, the inner end connect to the other second end of the inner tangential segment, iv) and an outer tangential segment having a first end connected to the outer end of the second radial segment, and an second end disposed on the outer periphery of the arced segment, D) wherein said first and second series of serpentine coils are connected at least at one end by a coil segment on the outer periphery of the arced segment that is disposed in a plane perpendicular to the first and second common planes and links an outer end of a radial segment of said first series of serpentine coils to an outer end a radial segment of said second series of serpentine coils.

12. The method of forming an axial gap dynamo electric machine according to claim 11 wherein at least one stator coil has an upper coil segment that is offset from a lower coil segment wherein the majority of the radial segments of the each of the upper coil are disposed between the tangential segments of the lower coil.

13. The method of forming an axial gap dynamo electric machine according to claim 12 wherein the stator coil has a plurality arc shaped serpentine coil segments that are encapsulated in a dielectric thermally conductive medium with each arc shaped segment having a U-shaped radial cross section.

14. The method of forming an axial gap dynamo electric machine according to claim 13 wherein the dielectric thermally conductive medium is fiber reinforced concrete.

* * * * *